United States Patent [19]
Whitney

[11] 3,986,004
[45] Oct. 12, 1976

[54] INDEXING APPARATUS FOR DICTATING AND TRANSCRIBING SYSTEMS

[75] Inventor: James C. Whitney, Fairfield, Conn.

[73] Assignee: Dictaphone Corporation, Rye, N.Y.

[22] Filed: Dec. 27, 1974

[21] Appl. No.: 536,857

[52] U.S. Cl. ............... 235/92 EV; 235/92 MP; 235/92 C; 235/92 DN; 235/92 V; 235/92 R; 360/72

[51] Int. Cl.² ............... G06M 3/14; G11B 15/18

[58] Field of Search ......... 235/92 DN, 92 C, 92 EV, 235/92 V, 92 CV, 92 MP, 103; 33/137 R; 250/570; 242/201, 186; 360/72

[56] References Cited
UNITED STATES PATENTS

| | | | |
|---|---|---|---|
| 1,979,028 | 10/1934 | Ewart | 235/92 C |
| 2,904,250 | 9/1959 | Allebach | 235/92 C |
| 2,973,899 | 3/1961 | Hegner | 235/92 C |
| 3,229,077 | 1/1966 | Gross | 235/92 EV |
| 3,684,213 | 8/1972 | Golden | 242/201 |
| 3,687,397 | 8/1972 | Suzuki | 235/103 |
| 3,793,508 | 2/1974 | Maggi | 235/92 EV |

Primary Examiner—Joseph M. Thesz
Attorney, Agent, or Firm—Curtis, Morris & Safford

[57] ABSTRACT

Indexing apparatus for use with dictating and transcribing systems, such as a tape recorder or the like, which provides a cumulative indication of the amount of tape awaiting an operation such as transcription of dictated material. The indexing apparatus is coupled to an apparatus such as a dictating and transcribing apparatus and indicates the quantity of tape upon which dictation has been made. As a transcriptionist transcribes dictation from the tape, the indexing apparatus reflects the quantity of tape transcribed so that at all times the indexing apparatus indicates the amount of tape ready to be transcribed to provide an indication of the load level of material waiting to be transcribed. Thus, as transcription is accomplished without further dictation the indicating apparatus will revert to a zero indication.

4 Claims, 7 Drawing Figures

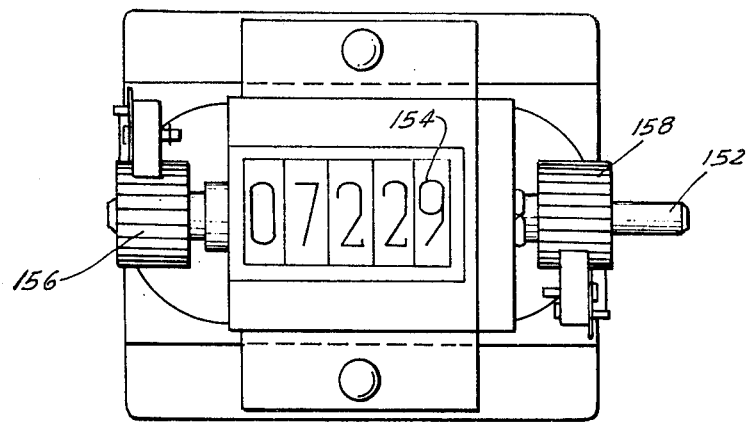
FIG. 6
FIG. 7
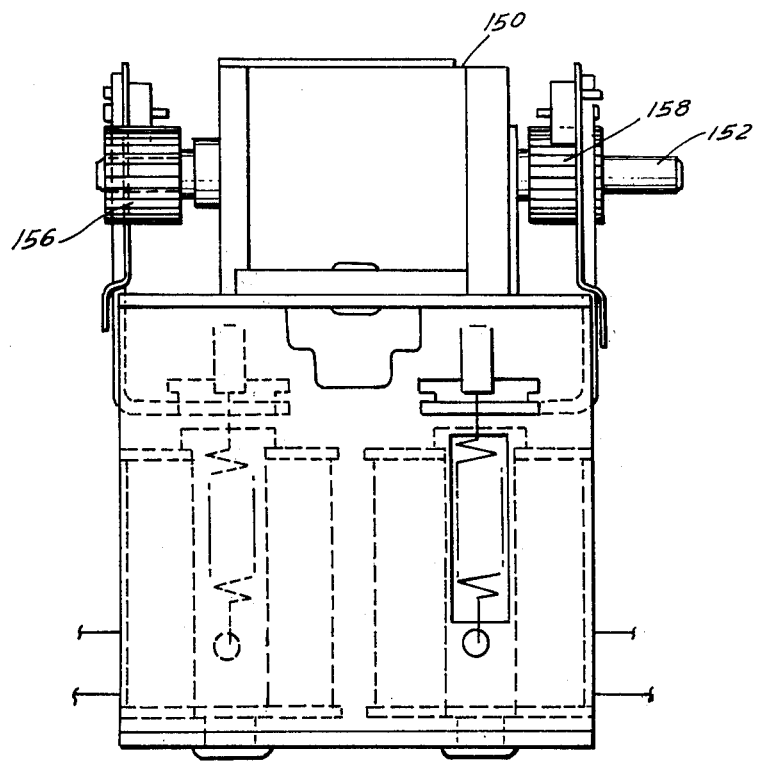

INDEXING APPARATUS FOR DICTATING AND TRANSCRIBING SYSTEMS

The present invention relates to indexing apparatus and more particularly to indexing apparatus for use on recording systems such as dictating and transcribing tape systems.

Magnetic tape systems for dictation and transcribing equipment are well known in the art as are devices to indicate the length of dictation imparted to the magnetic recording medium. Such indication means, for example indicator strips of paper or the like upon which the dictator may place a mark or signal provide a ready means for the transcriptionist to visually ascertain the amount of dictated material waiting to be transcribed.

However, with the advent of dictation and transcribing systems utilizing an endless loop of magnetic tape which is retained in an enclosed housing, often at a remote location, the use of indicator strips of paper or the like is not desirable. In addition since such endless loop tape dictation systems allow a dictator to continue to dictate even while the transcriptionist is transcribing previous dictation, it becomes advantageous to provide some type of indication of the amount of dictation on the magnetic tape as well as to provide means to indicate the completion of transcription, in essence, to subtract, from the indicating device, the quantity of tape which has been transcribed.

Thus, it is an object of the present invention to provide an indicating apparatus for use with a dictation and transcription device which provides a cumulative reading of the amount of tape with dictation on it which is awaiting to be transcribed.

A further object of the present invention is to provide such an indicating device which will automatically subtract from the indicating device the amount of tape which has been reviewed and transcribed by the transcriptionist so that the indicating device provides an indication of the load or quantity of dictation awaiting transcription.

It is a further object of the present invention to provide such an indicating device which is relatively simple to construct and operate and which will always provide a positive or cumulative indication of the "work load" awaiting the transcriptionist at all times.

These and other objects and advantages of the present invention will be more readily apparent after consideration of the following specification taken in conjunction with the accompanying drawing, wherein:

FIG. 6 is a plan view of the embodiment of FIG. 5; and

FIG. 7 is a side elevational view of the embodiment shown in FIG. 5.

Figure 1:
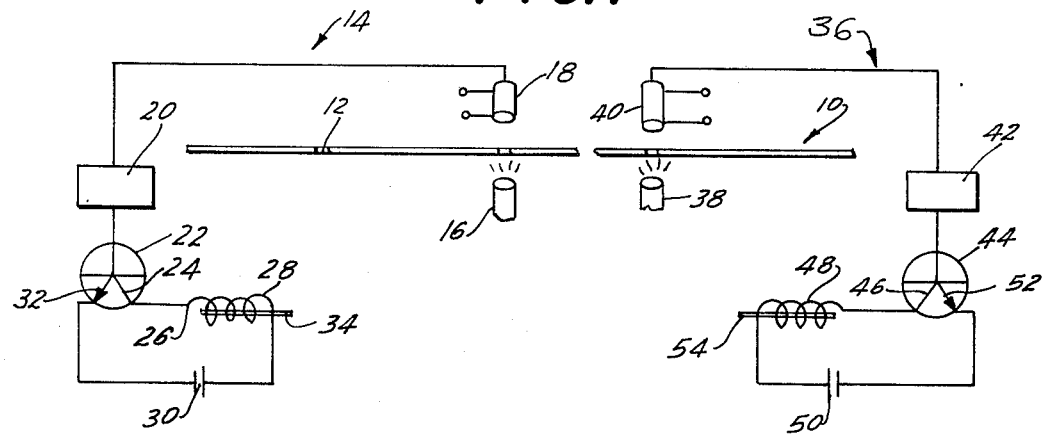
FIG. 1 is a diagrammatic representation of the manner in which passage of the recording medium past a fixed point is ascertained.

With reference to the drawing and particularly FIG. 1, there is shown a segment 10 of a recording medium, for example magnetic tape upon which has been placed a series of equally spaced holes 12 therethrough. Indicated at 14 is a dictator station within a dictation and transcribing apparatus where tape 10 from a source of supply is pulled past a transducer head (not shown) where the dictator's voice signals are impressed thereon. At station 14 the tape 10 is drawn past a light emitting diode 16 positioned on one side of the tape so that the holes 12 within the tape pass in register therewith and on the other side of the tape, in line with the light emitting diode 16, a phototransmitter element 18 is placed. The phototransmitter element 18 is connected to a logic circuit 20, which is more fully described in co-pending application Ser. No. 537,924 filed on Jan. 2, 1975.

The logic circuit 20 leads to a transistor 22 which has its collector element 24 connected to one end 26 of a coil 28 with the other end of the coil connected through a voltage source 30 to the emitter 32 of transistor 22. A core element 34 within coil 28 of the solenoid is magnetically excited each time a hole 12 passes over a light emitting diode 16 to operate the indexing apparatus, as will be explained more fully hereinbelow.

In like manner the transcription station, indicated generally at 36, includes a light emitting diode 38, a phototransmitter element 40 connected through a similar logic circuit 42 to a transistor 44 with the emitter 46 of transistor 44 connected to one end of a coil 48 with the other end connected to a voltage source 50 to the emitter 52 of the transistor 44. Thus, in like manner core element 54 of coil 48 is excited responsive to the passage of a hole 12 over light emitting diode 38.

Figure 2:
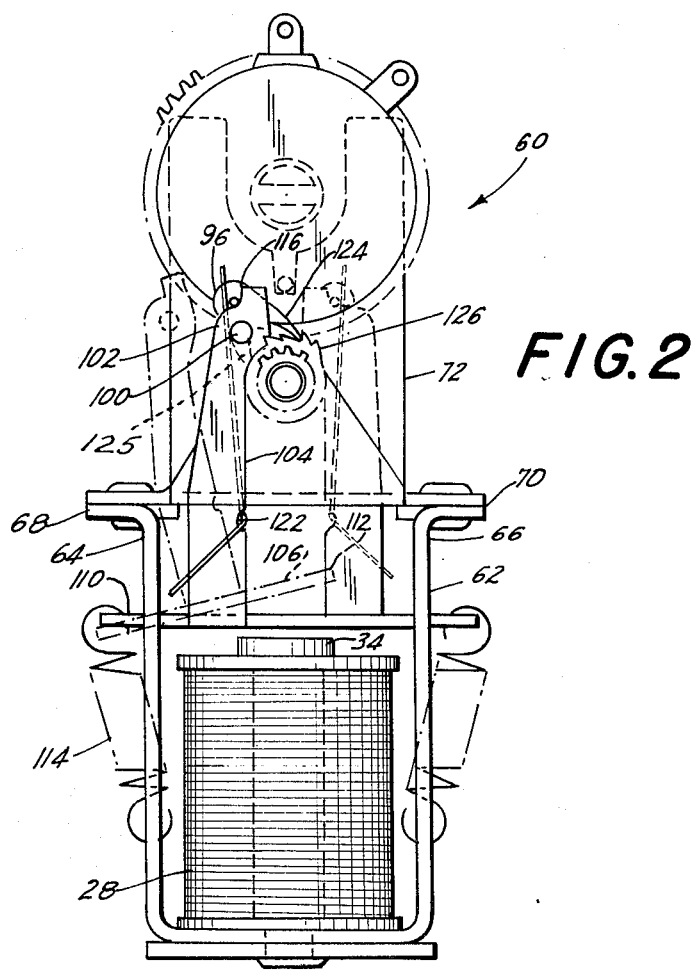
FIG. 2 is an end elevational view of one embodiment of the indexing apparatus of the present invention.
Figure 3:
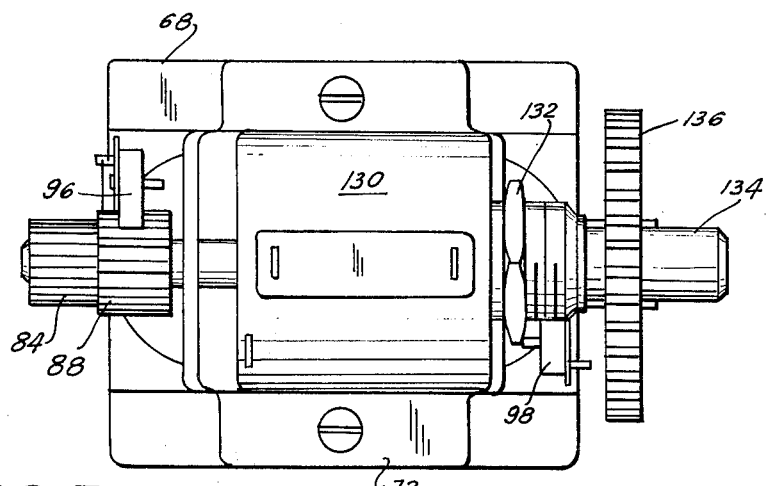
FIG. 3 is a plan view of the embodiment shown in FIG. 2.
Figure 4:
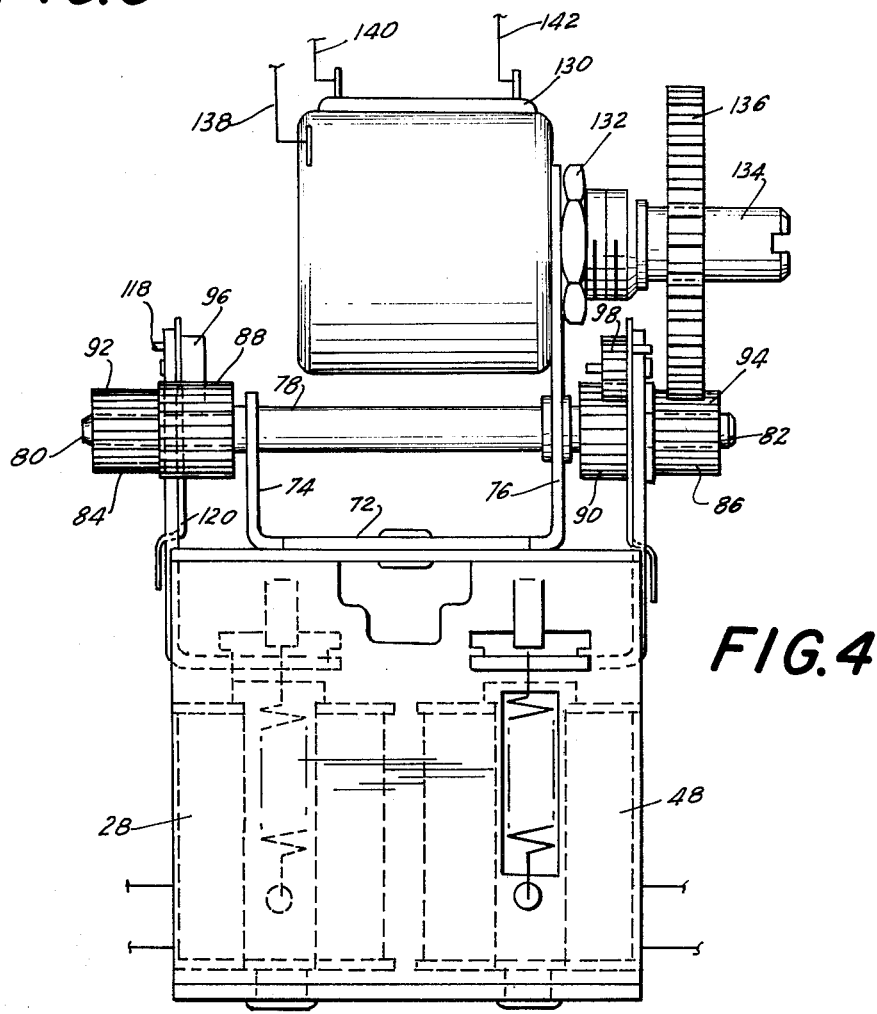
FIG. 4 is a side elevational view of the embodiment shown in FIG. 2.

With reference now to FIGS. 2, 3 and 4, an indicating apparatus 60 is shown which correlates the input from the sensed passage of the holes 12 over the light emitting diode 16 in dictation station 14 and over light emitting diode 38 in transcription station 36.

The apparatus 60 includes a generally U-shaped housing 62 having legs 64 and 66 within which are secured the coils 28 and 48. The upper ends of legs 64 and 66 are turned outwardly to form a support platform 68 and 70, respectively, on which is supported a bracket 72. Bracket 72 includes an upstanding lug or ear 74 on one side and a longer upstanding ear or lug 76 on its other side and journaled within upstanding lugs 74 and 76 is a shaft 78. Fixed to each end 80 and 82, respectively, of shaft 78 are identical ratchet and spur gear elements 84 and 86, respectively. Elements 84 and 86 are made identical for ease of assembly but only one element need be a combination ratchet wheel and gear element, as will be explained more fully hereinbelow.

The combination spur gear and ratchet wheel member 84 and 86, respectively, are assembled on shaft 78 so that the ratchet segments 88 and 90, respectively, are disposed more inwardly from the ends 80 and 82 of the shaft 78 so that spur gear segments 92 and 94, respectively, are adjacent the shaft ends.

Claw shaped pawls 96 and 98, respectively, are provided to engage each of the ratchet wheel elements 88 and 90 and are mounted on opposite sides of the shaft 78 so that the engagement of pawl 96 with ratchet segment 88 rotates shfat 78 in one direction and the engagement of pawl 98 with ratchet segment 90 rotates shaft 78 in the opposite direction. The pawls 96 and 98, while mounted on opposite sides of shaft 78, are mounted and are engageable with their respective ratchet segments by identical mechanisms so that the mechanism for pawl 96 will be described herein with the understanding that like elements associated with pawl 98 will be designated by the same numeral followed by an a.

Pawl 96 is pivotally mounted, as at 100, on one end 102 of leg 104 of a T-shaped, in cross-section, bracket 106. The other leg 108 of bracket 106 has one end 110 pivotally mounted within leg 64 of housing 62 with its other end 112 disposed over the magnetic core 34 of coil 28. A tension spring 114 is connected from end 110 of bracket 106 to the housing 62 to bias the bracket 106 to the broken line position shown in FIG. 2 where its end 112 is spaced from the top of the core 34.

End 102 of leg 104 is provided with a notched out portion 116 which acts as an end stop for a lug 118 extending from pawl 96 to limit pivoting movement of pawl 96. Pawl 96 is maintained with lug 118 against notch 116 by a spring member 120 hooked around a notch 122 on leg 104 and about the extending lug 118. This orients the claw segment 124 of pawl 96 in the proper orientation to abut against the teeth 126 of the ratchet segment 88 when the pawl 96 is moved from the broken line position in FIG. 2 to the solid line position. Such movement is initiated by excitation of coil 28 to magnetize the core 34 which draws leg 106 downwardly in abutting relationship against the top of the core member 34. As this occurs, claw 124 engages a single tooth 126 of ratchet segment 88 and causes shaft 78 to rotate in a clockwise direction as viewed in FIG. 2.

The pawl 96 further includes a detent segment 125 which is spaced from the claw segment 124 and is seen to act as a stop member against which another tooth 126 abuts when the claw segment rotates the ratchet segment 88. It should be recognized that this detent segment serves to limit the amount of rotation of the ratchet segment. Accordingly, the separation of the claw and detent segments precisely determines the increment of angular rotation of the ratchet segment, and thus of the shaft 78, for each instance of excitation of the coil 28. More liberal mechanical tolerances are, therefore, permissible.

Thus, excitation of coil 28, responsive to sensed passage of holes 12 in tape 10 past diode 16 causes shaft 78 to rotate in one direction and excitation of coil 48 responsive to sensed passage of tape 10 past diode 38 causes shaft 78 to rotate in the opposite direction.

To correlate the rotation of shaft 78 responsive to excitation of coils 28 and 48, a potentiometer 130 is provided mounted to the upper extension of leg 76 of bracket 72. Potentiometer 130 is secured in any convenient manner, for example by a nut 132, and its output shaft 134 has fixed thereto a large spur gear member 136 which is in mesh with spur gear segment 94 fixed to shaft 78. The leads 138, 140 and 142 from potentiometer 130 are suitably connected to a meter indication device (not shown) to provide a cumulative indication of the amount of magnetic tape awaiting for transcription.

In use, as dictation occurs on tape 10 in dictate station 14, the holes 12 in the tape pass over the light emitting diode 16 and the passage of each hole 12 over diode 16 initiates an electrical impulse to excite coil 28. Each time coil 28 receives an electrical impulse, pawl 96 is brought into contact with ratchet segment 88 and rotates shaft 78. Continual rotation of shaft 78, by passage of tape through the dictate station 14 causes the output voltage of potentiometer 130 to change and the change in voltage is indicated by an appropriate meter device to indicate the quantity of tape awaiting transcription. Such indication may be correlated to the length of tape or a suitable measure of the time, for example minutes of dictation and is, in essence, a positive indication of the tape awaiting transcription.

As a transcriptionist activates the transcribe station 36 and begins transcribing tape upon which dictation has been made, tape 10 passes over light emitting diode 38 and each time a hole 12 passes over diode 38 coil 48 is excited. With each impulse to coil 48 pawl 98 is brought into contact with ratchet segment 90 to rotate shaft 78 in the opposite direction. Rotation of shaft 78 in this direction changes the output voltage of potentiometer 130 to correspondingly change the meter indicator to show a decrease or negative indication of the quantity of tape awaiting to be transcribed. Thus, if a dictator has stopped dictating and the transcriptionist completes transcribing all the tape that has dictation on it the meter will indicate zero. Thus, the apparatus provides a cumulative indication of tape awaiting transcription.

Figure 5:
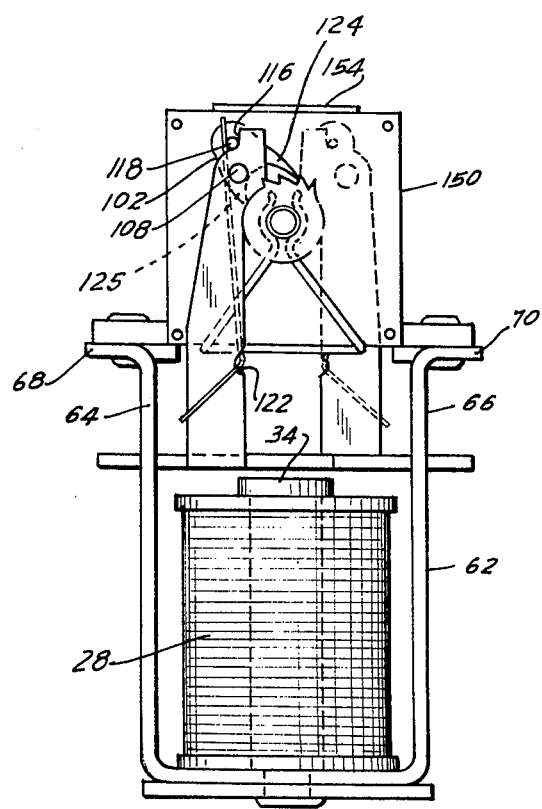
FIG. 5 is an end elevational view of an alternate embodiment of the indexing mechanism of the present invention.

Reference is now made to FIGS. 5, 6 and 7 for an alternate embodiment of the indexing apparatus of the present invention. In this embodiment elements which are the same as elements in the embodiment of FIGS. 2, 3 and 4 are numbered with like reference numerals. In the embodiment of FIGS. 5 through 7, instead of utilizing a potentiometer with the variation in the output voltage changing a metered indicator, a digital counter mechanism is utilized.

In this embodiment the digital counter mechanism 150 is mounted directly on the support surfaces 68 and 70 of U-shaped housing 62. The digital counter 150 includes a shaft 152 extending therethrough and journaled therein. Rotation of shaft 152 in one direction causes the numerals on digital dial 154 of indicator 150 to progressively increase and rotation of shaft 152 in the opposite direction causes the numerical indicator display on dial 154 to progressively decrease. Thus positive indication when tape is dictated upon results in progressive increase of the digital readout while transcription results in progressive decrease.

Fixed to each end of shaft 152 are identical ratchet wheel members 156 and 158, respectively, which are engageable by pawl members 96 and 98, respectively, in the same manner as in the embodiment of FIGS. 3 through 5. Thus as coils 28 and 48 are energized responsive to the sensed passage of tape 10 over diodes 16 and 38 pawls 96 and 98 pivot into engagement with ratchet wheel members 156 and 158, respectively, to incrementally rotate shaft 152 in the corresponding direction. This rotation of shaft 152 either progressively increases the numerical designation 154 or progressively decreases it depending upon the sensed passage of tape.

It is thus seen that the present invention provides an indexing apparatus to indicate the cumulative passage of a recording medium such as magnetic tape through a dictate and transcribe station of a dictation and transcribing system so that a load level for the amount of dictation waiting to be transcribed can be readily ascertained.

What is claimed is:

1. An indexing apparatus for indicating the difference between the number of occurrences of a first predetermined characteristic and the number of occurrences of a second predetermined characteristic as represented by first and second pulse signals, respectively, comprising: a housing; first and second solenoids mounted in said housing for receiving said first and second pulse signals, respectively; a bracket disposed on said housing; a first shaft journaled for rotation in said bracket; first and second ratchet wheels secured to said first shaft in spaced apart relation thereon; first pawl means pivotally mounted in said housing and having a first portion disposed over said first solenoid so as to pivot said first pawl means when said first solenoid is energized by said first pulse signals, said first pawl means having a leg extending from and pivotal with said first portion, said leg having a claw segment adapted to abut against tooth of said first ratchet wheel when said first pawl means pivots in response to the energization of said first solenoid and further having a detent segment spaced from said claw segment adapted to abut against another tooth of said first ratchet wheel when said first pawl means pivots in response to the energization of said first solenoid, whereby said first ratchet wheel is rotated in one direction by a predetermined increment in response to the abutment thereagainst of said first pawl means claw segment, said rotation being limited by the abutment of said first pawl means detent segment against said first ratchet wheel; second pawl means pivotally mounted in said housing and having a first portion disposed over said second solenoid so as to pivot said second pawl means when said second solenoid is energized by said second pulse signals, said second pawl means having a leg extending from and pivotal with said first portion, said leg having a claw segment adapted to abut against a tooth of said second ratchet wheel when said second pawl means pivots in response to the energization of said second solenoid and further having a detent segment spaced from said claw segment adapted to abut against another tooth of said second ratchet wheel when said second pawl means pivots in response to the energization of said second solenoid, whereby said second ratchet wheel is rotated in the opposite direction by said predetermined increment in response to the abutment thereagainst of said second pawl means claw segment, said rotation of said second ratchet wheel being limited by the abutment of said second pawl means detent segment thereagainst; and means coupled to said first shaft and driven by the rotation thereof to provide an indication of the difference between the number of received first and second pulse signals.

2. Indexing apparatus as defined in claim 1 wherein said indication means includes a potentiometer having an output shaft, a first gear secured to said output shaft and a second gear secured to said first shaft and in meshing engagement with said second gear to rotate and output shaft in one direction responsive to the energization of said first solenoid by said first pulse signals and to rotate said output shaft in the opposite direction responsive to the energization of said second solenoid by said second pulse signals.

3. Indexing apparatus as defined in claim 1 wherein said indication means includes a digital counter mounted on said first shaft and having a numerical dial indicator progressing numerically higher when said first shaft is rotated in one direction and progressing numerically lower when said shaft is rotated in said opposite direction.

4. In a recording and transcribing system of the type having a recording medium upon which information is dictated and transcribed and including first sensing means to determine the quantity of recording medium passing a dictation station, second sensing means to determine the quantity of recording medium passing a transcribe station and means responsive to said first and second sensing means to produce first and second pulse signals as said medium moves past said dictation and transcribe stations, indexing apparatus to indicate the cumulative total of recording medium moved past said dictation and transcribe stations, comprising: a housing; first and second solenoids mounted in said housing for receiving said first and second pulse signals, respectively; a bracket disposed on said housing; a first shaft journaled for rotation in said bracket; first and second ratchet wheels secured to said first shaft in spaced apart relation thereon; first pawl means pivotally mounted in said housing and having a first portion disposed over said first solenoid so as to pivot said first pawl means when said first solenoid is energized by said first pulse signals, said first pawl means having a leg extending from and pivotal with said first portion, said leg having a claw segment adapted to abut against a tooth of said first ratchet wheel when said first pawl means pivots in response to the energization of said first solenoid and further having a detent segment spaced from said claw segment adapted to abut against another tooth of said first ratchet wheel when said first pawl means pivots in response to the energization of said first solenoid, whereby said first ratchet wheel is rotated in one direction by a predetermined increment in response to the abutment thereagainst of said first pawl means claw segment, said rotation being limited by the abutment of said first pawl means detent segment against said first ratchet wheel; second pawl means pivotally mounted in said housing and having a first portion disposed over said second solenoid so as to pivot said second pawl means when said second solenoid is energized by said second pulse signals, said second pawl means having a leg extending from and pivotal with said first portion, said leg having a claw segment adapted to abut against a tooth of said second ratchet wheel when said second pawl means pivots in response to the energization of said second solenoid and further having a detent segment spaced from said claw segment adapted to abut against another tooth of said second ratchet wheel when said second pawl means pivots in response to the energization of said second solenoid, whereby said second ratchet wheel is rotated in the opposite direction by said predetermined increment in response to the abutment thereagainst of said second pawl means claw segment, said rotation of said second ratchet wheel being limited by the abutment of said second pawl means detent segment thereagainst; and means coupled to said first shaft and driven by the rotation thereof to provide an indication of the difference between the amount of recording medium moved past said dictation station and the amount of recording medium moved past said transcribe station.

* * * * *

UNITED STATES PATENT OFFICE
CERTIFICATE OF CORRECTION

Patent No. 3,986,004           Dated October 12, 1976

Inventor(s) James C. Whitney

It is certified that error appears in the above-identified patent and that said Letters Patent are hereby corrected as shown below:

Column 5, line 18, "a" was omitted before the word -- tooth --
Column 5, line 58, "and" should be -- said --

Signed and Sealed this

Fourteenth Day of December 1976

[SEAL]

Attest:

RUTH C. MASON
*Attesting Officer*

C. MARSHALL DANN
*Commissioner of Patents and Trademarks*